United States Patent
Hattar

(10) Patent No.: US 10,156,175 B1
(45) Date of Patent: Dec. 18, 2018

(54) METHOD AND SYSTEM FOR RATIONALIZING A DELTA PRESSURE SENSOR FOR A GASOLINE PARTICULATE FILTER IN A VEHICLE PROPULSION SYSTEM

(71) Applicant: GM GLOBAL TECHNOLOGY OPERATIONS LLC, Detroit, MI (US)

(72) Inventor: Rafat F. Hattar, Royal Oak, MI (US)

( * ) Notice: Subject to any disclaimer, the term of this patent is extended or adjusted under 35 U.S.C. 154(b) by 0 days.

(21) Appl. No.: 15/897,475

(22) Filed: Feb. 15, 2018

(51) Int. Cl.
*F01N 9/00* (2006.01)
*F01N 3/023* (2006.01)
*F01N 11/00* (2006.01)

(52) U.S. Cl.
CPC ............ *F01N 9/002* (2013.01); *F01N 3/023* (2013.01); *F01N 11/002* (2013.01); *F01N 2900/0406* (2013.01); *F01N 2900/08* (2013.01); *F01N 2900/1402* (2013.01); *F01N 2900/1606* (2013.01)

(58) Field of Classification Search
CPC . F01N 9/00; F01N 9/002; F01N 3/023; F01N 11/002; F01N 2900/0406; F01N 2900/08; F01N 2900/1402; F01N 2900/1606
See application file for complete search history.

(56) References Cited

U.S. PATENT DOCUMENTS

| | | | |
|---|---|---|---|
| 7,474,953 B2 | 1/2009 | Hulser et al. | |
| 8,478,565 B2 | 7/2013 | Ardanese et al. | |
| 8,935,953 B2 | 1/2015 | Sun et al. | |
| 9,091,190 B2 | 7/2015 | Sarsen et al. | |
| 9,140,156 B2 | 9/2015 | Swoish et al. | |
| 9,206,719 B2 | 12/2015 | Swoish et al. | |
| 9,371,754 B2 * | 6/2016 | Bloms | F01N 3/0256 |

* cited by examiner

*Primary Examiner* — Hieu T Vo

(57) ABSTRACT

A vehicle propulsion system includes a particulate filter having an inlet in communication with an exhaust outlet of an engine, a differential pressure sensor that measures the differential pressure between the particulate filter inlet and the particulate filter outlet, a soot mass module that determines a soot mass independently of a differential pressure across the particulate filter and a first soot model that relates a soot mass in the particulate filter independently of a differential pressure across the particulate filter, a differential pressure module that estimates a differential pressure across the particulate filter based upon the determined soot mass, an exhaust flow, and a second soot model, and a comparison module that compares the estimated differential pressure to the differential pressure signal from the differential pressure sensor.

16 Claims, 4 Drawing Sheets

METHOD AND SYSTEM FOR RATIONALIZING A DELTA PRESSURE SENSOR FOR A GASOLINE PARTICULATE FILTER IN A VEHICLE PROPULSION SYSTEM

FIELD

The present disclosure relates to a method and system for rationalizing a delta pressure sensor for a gasoline particulate filter in a vehicle propulsion system

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle exhaust treatment systems may be used to reduce undesired emissions, such as oxides of nitrogen ($NO_x$) and particulate matter (e.g., soot) output by the vehicle engine. The vehicle exhaust systems may typically include a gasoline particulate filter ("GPF"), which may trap the soot from the exhaust gas generated by the engine. The GPF may include one or more filter substrates that define a plurality of apertures, through which the exhaust gas must flow. The particulate matter collects on the filter substrate as the exhaust gas flows through the apertures. A regeneration operation may be performed to burn away the collected particulate matter and regenerate the GPF. The regeneration operation heats the particulate filter to a combustion temperature sufficient to combust (i.e., burn) the collected particulate matter.

Regeneration events may be determined by monitoring a pressure drop through the GPF. The pressure drop or "delta pressure" across the GPF is related to the exhaust flow impedance through the GPF. The exhaust flow impedance is directly related to the soot loading (i.e. the amount of soot that may be trapped in the filter substrate) of the GPF. Data relating the relationship between soot loading and the delta pressure may be used to estimate the amount of soot loading based upon a measurement of a delta pressure using a delta pressure sensor. In this manner, when the soot loading which corresponds to the measured delta pressure exceeds a predetermined level a regeneration event may be triggered.

Pressure sensors, including a delta pressure sensor for a GPF, are susceptible to errors. If a delta pressure sensor reads lower than the actual pressure drop, regeneration may not be triggered, the exhaust temperature may be high and if an engine fuel cut off occurs, then the GPF may be damaged. Conversely, if the delta pressure sensor reads higher than the actual pressure drop, then vehicle drivability, and emissions may be adversely affected. There are specific, government-mandated requirements to determine whether a GPF is functioning to suitably trap and removed soot and other particles from the exhaust gas generated by the engine. Therefore, it is desirable to rationalize the signal from the delta pressure sensor to improve the identification, verification of failed components in an exhaust treatment system, and also to improve a GPF regeneration strategy.

Conventional delta pressure sensor rationalization systems may have relied upon an analysis of the voltage from the sensor upon system initialization (i.e. vehicle propulsion system key up) which is only capable of identifying a voltage shift or voltage offset. These systems may compare voltage signals and if the system determines that the voltage has shifted or offset by greater than a predetermined threshold then a potential failure may be identified. However, these systems are only capable of analyzing an offset of voltage which may be insufficient for accurately determining whether a failure exists or not.

Other conventional systems may rely upon a set of redundant sensors in order to rationalize a delta pressure sensor. However, providing an additional/redundant sensor increases the cost of the system.

SUMMARY

In an exemplary aspect, a vehicle propulsion system includes an internal combustion engine having a combustion exhaust outlet, a particulate filter having an inlet in communication with the combustion exhaust outlet of the internal combustion engine for receiving a combustion exhaust stream, a differential pressure sensor in communication with the inlet to the particulate filter and an outlet of the particulate filter and that generates a differential pressure signal based upon the differential pressure between the particulate filter inlet and the particulate filter outlet, a soot mass module that determines a soot mass indicative of an amount of soot stored in the particulate filter independently of a differential pressure across the particulate filter and a first soot model that relates a soot mass in the particulate filter independently of a differential pressure across the particulate filter, a differential pressure module that estimates a differential pressure across the particulate filter based upon the determined soot mass, an exhaust flow volume through the particulate filter, and a second soot model that relates a differential pressure across the particulate filter, the exhaust flow volume and an amount of soot stored in the particulate filter, and a comparison module that compares the estimated differential pressure to the differential pressure signal from the differential pressure sensor and generates an indicator if the difference between the estimated differential pressure to the differential pressure signal from the differential pressure sensor is greater than a predetermined amount.

In this manner, the system and method of the present disclosure relies upon a soot load model that is based independently from a differential pressure sensor for a GPF to rationalize a differential pressure sensor for the GPF to as to improve and confirm that the GPF is operating properly to remove particulates from the exhaust stream. As explained previously, some conventional systems may only diagnose and/or rationalize the differential pressure sensor signal solely based upon an analysis of the voltage offset. However, in order to fully rationalize/diagnose the differential pressure signal the slope of the signal also needs to be analyzed. Conventionally, in order to do that either a redundant sensor is required or the full sensor response curve needs to be collected and analyzed, which can be both expensive and complex. The present disclosure enables rationalization/diagnosis of the differential pressure without these disadvantages through use of a soot load model which, in turn, enables confirmation that the vehicle propulsion system is operating properly.

In another exemplary aspect, the soot mass module determines a soot mass indicative of an amount of soot stored in the particulate filter based upon an estimated amount of soot exiting the engine.

In another exemplary aspect, the soot mass module determines the soot mass indicative of an amount of soot stored in the particulate filter further based upon an engine out soot model.

In another exemplary aspect, the system further includes an indicator that provides a notice in the vehicle of a potential failure in the particulate filter function of the vehicle.

In another exemplary aspect, the system further includes a regeneration module that initiates regeneration of the particulate filter if the differential pressure signal, the volume of flow through the filter, and the second soot model indicate a soot load that is higher than a predetermined threshold.

In another exemplary aspect, the soot mass module determines a soot mass indicative of an amount of soot stored in the particulate filter based upon an operating condition of the vehicle propulsion system.

In another exemplary aspect, the operating condition includes one of fuel consumption, a combustion temperature, a piston temperature, a cylinder wall temperature, an exhaust temperature, and an intake temperature.

In another exemplary aspect, the soot mass module determines a soot mass indicative of an amount of soot stored in the particulate filter based upon one of a filtering efficiency of the particulate filter, a soot burn rate, and an exhaust oxygen concentration.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
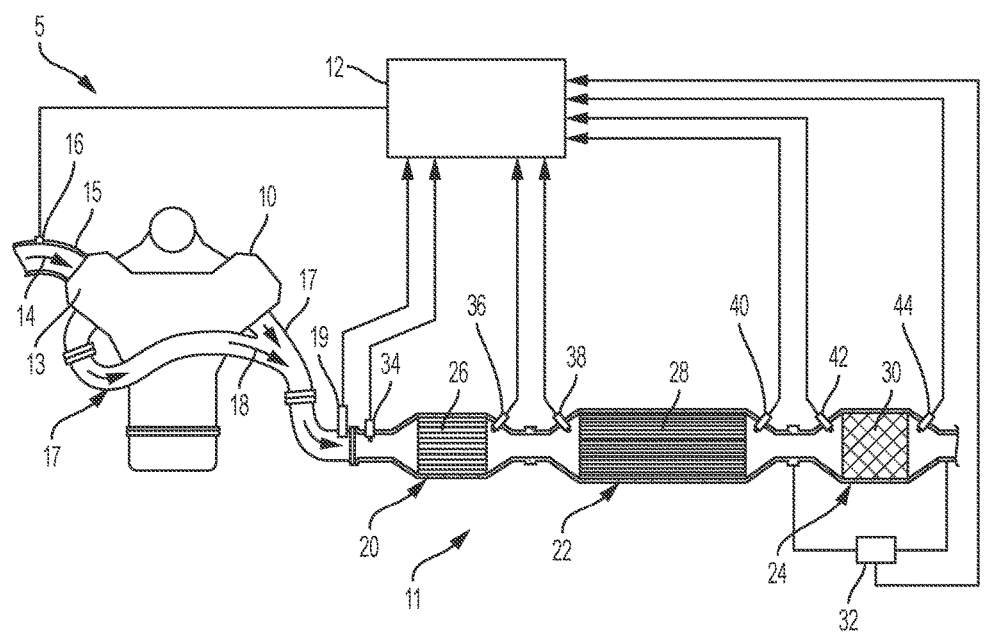
FIG. 1 is a schematic illustration of a vehicle propulsion system.

Referring now to FIG. 1, a vehicle system 5 is generally shown according to an exemplary embodiment of the present disclosure. The vehicle system 5 includes an internal combustion (IC) engine 10, an exhaust gas treatment system 11, and a controller 12. The engine 10 may include, but is not limited to, a diesel engine, gasoline engine, and a homogeneous charge compression ignition engine. The engine 10 includes at least one cylinder 13 configured to receive fuel, and intake air 14 from an air intake passage 15. The air intake passage 15 includes a mass air flow (MAF) sensor 16 to determine an intake air mass of the engine 10. The exhaust gas conduit 17 may include one or more segments containing one or more after-treatment devices of the exhaust gas treatment system 11, as discussed in greater detail below. A $NO_x$ sensor 19 may be disposed downstream from the engine 10 to determine an amount of $NO_x$ present in the exhaust gas 18 and/or a $NO_x$ flow rate.

The exhaust gas treatment system 11 described herein can be utilized with any of the engine systems described above to reduce exhaust gas constituents generated during combustion. The exhaust gas treatment system 11 generally includes one or more exhaust treatment devices. The exhaust treatment devices include, but are not limited to, an oxidation catalyst device ("OC") 20, and a selective catalytic reduction ("SCR") device 22, and a gasoline particulate filter ("GPF") 24. As can be appreciated, the exhaust gas treatment system 11 of the present disclosure may include various combinations of one or more of the exhaust treatment devices shown in FIG. 1, and/or other exhaust treatment devices (not shown) and is not limited to the present example. For example, an individual GPF 24 may be disposed downstream from a separate SCR device 22, multiple exhaust treatment devices may be combined and/or any device may have multiple functions without limitation.

In FIG. 1, the exhaust gas conduit 17, which may include several segments, transports exhaust gas 18 from the engine 10 to the various exhaust treatment devices 20, 22, 24 of the exhaust gas treatment system 11. As can be appreciated, the OC 20 can be of various flow-through, oxidation catalyst devices known in the art. In various embodiments the OC 20 may include a flow-through metal or ceramic monolith substrate 26 that is wrapped in an intumescent mat or other suitable support that expands when heated, securing and insulating the substrate. The substrate 26 may be packaged in a stainless steel shell or canister having an inlet and an outlet in fluid communication with the exhaust gas conduit 17. The substrate 26 can include an oxidation catalyst compound. The oxidation catalyst compound may be applied as a washcoat and may contain platinum group metals such as platinum (Pt), palladium (Pd), rhodium (Rh) or other suitable oxidizing catalysts, or combination thereof. The OC 20 is useful in treating unburned gaseous HC and CO, which are oxidized to form carbon dioxide and water.

The SCR device 22 may be disposed downstream of the OC 20, and is configured to reduce NO constituents in the exhaust gas. As can be appreciated, the SCR device 22 may be constructed of various materials known in the art. In various embodiments, the SCR device 22 includes an SCR substrate 28. A SCR catalyst composition (e.g., a SCR washcoat) may be applied to the SCR substrate 28. The SCR device 22 may utilize a reductant, such as ammonia ($NH_3$) to reduce the $NO_x$. More specifically, the SCR device 22 catalyst composition can contain a zeolite and one or more base metal components such as iron (Fe), cobalt (Co), copper (Cu) or vanadium (V) which can operate efficiently to convert $NO_x$ constituents in the exhaust gas in the presence of $NH_3$. The reductant utilized by the SCR device 22 may be in the form of a gas, a liquid, or an aqueous urea solution and may be mixed with air to aid in the dispersion of an injected spray generated by a reductant supply system as known to those ordinarily skilled in the art.

The GPF 24 may be disposed downstream from the SCR device 22, and filters the exhaust gas 18 of carbon and other particulate matter (e.g., soot). The GPF 24 has an inlet and an outlet in fluid communication with exhaust gas conduit 17 to convey exhaust gas 18. According to an exemplary embodiment, the GPF 24 may be constructed using a ceramic wall flow monolith exhaust gas filter substrate 30 that is wrapped in an intumescent or non-intumescent material (not shown). The exhaust gas treatment system 11 may perform a regeneration operation that regenerates the GPF 24 by burning off the particulate matter trapped in the filter substrate 30. Various systems known to those ordinarily skilled in the art (e.g., active regeneration systems and/or passive regeneration systems) may be used for performing the regeneration operation to regenerate the GPF 24.

The exhaust gas treatment system 11 may further include a delta pressure sensor 32, as illustrated in FIG. 1. The delta pressure sensor 32 may determine the pressure differential across the GPF 24 (e.g., between the GPF inlet and the GPF outlet). Although a single delta pressure sensor 32 is illustrated, it is appreciated that a plurality of pressure sensors may be used to determine the pressure differential across the GPF 24. For example, a first pressure sensor may be disposed at the inlet of the GPF 24 and a second pressure sensor may be disposed at the outlet of the GPF 24. Accordingly, the difference between the pressure detected by the second delta pressure sensor and the pressure detected by the first delta pressure sensor may indicate the the pressure differential across the GPF 24.

In addition to pressure sensors, the exhaust gas treatment system 11 may include one or more temperature sensors. According to an exemplary embodiment of the present disclosure, the exhaust gas treatment system 11 may include temperature sensors 34-44. Although six temperature sensors are described, the number of temperature sensors illustrated in FIG. 1, however, is not limited thereto. First temperature sensor 34 and second temperature sensor 36 are disposed at the inlet and outlet of the OC 20, respectively, and may determine a temperature of the OC substrate 26. Third temperature sensor 38 and fourth temperature sensor 40 are disposed at the inlet and outlet of the SCR device 22, respectively, and may determine a temperature of the SCR device 22. Fifth temperature sensor 42 and sixth temperature sensor 44 are disposed at the inlet and outlet of the PF 24, respectively, and may determine a temperature of the filter substrate 30.

The controller 12 controls one or more operations of the engine 10 and/or the exhaust gas treatment system 11 based on measurements provided by one or more sensors and/or operating models. According to an exemplary embodiment, the controller 12 may control the regeneration operation, which regenerates the GPF 24 when a regeneration event occurs. The regeneration operation may heat the particulate filter 30 to a temperature sufficient to combust (i.e., burn) the collected soot.

Figure 2:
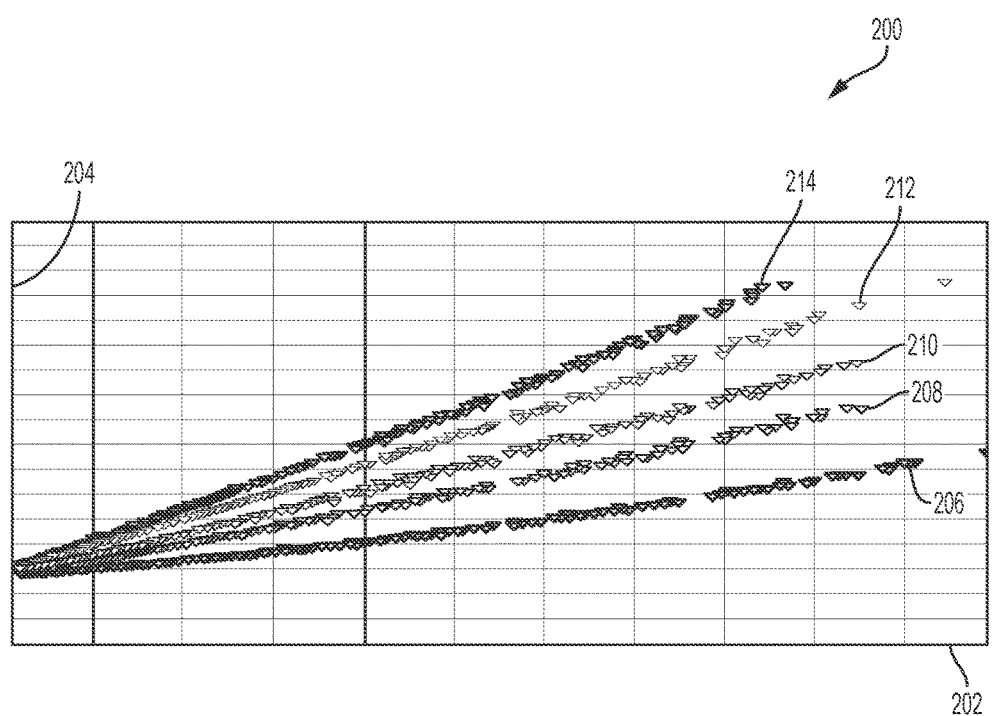
FIG. 2 is a graph that illustrates a relationship between a differential pressure across a particulate filter, an amount of exhaust flow and a soot load of the particulate filter.

To determine when the GPF 24 regeneration event is required, the controller 12 may monitor the signal from the delta pressure sensor 32 and estimate the amount of soot loading of the GPF. FIG. 2 is a graph 200 which relates a pressure drop across the GPF to a soot load based upon the amount of exhaust flow. The horizontal axis 202 represents the volume of exhaust flowing through the exhaust system and the vertical axis 204 corresponds to the amplitude of a signal from the delta pressure sensor 32. The data points that are plotted on graph 200 may be determined by collecting data during a calibration process. The graph 200 in FIG. 2 includes data from five different soot loadings 206-214 which may range from a completely clean GPF 206 (i.e zero soot load) to a very highly soot loaded GPF 214, respectively. During operation of a vehicle, a controller may estimate the amount of soot loading based upon the volume of exhaust flow and the signal from a delta pressure sensor by referencing the data from graph 200. If the controller determines that the soot load exceeds a predetermined threshold, a regeneration event may be initiated. Exemplary methods and systems for determining a soot load for a particulate filter, based at least partially upon the differential pressure across the filter, are described in co-assigned U.S. Pat. Nos. 9,140,156, 9,206,719, 8,478,565, and 9,091,190, the disclosures of which are incorporated herein in their entirety.

In accordance with an exemplary embodiment of the present disclosure, in order to rationalize the delta pressure sensor, a soot load calculation is made independently of the delta pressure sensor and a corresponding delta pressure is then back calculated based upon the calibrated relationship between delta pressure and soot load as illustrated in, for example, FIG. 2. The back calculated delta pressure may then be compared with the actual signal from the delta pressure sensor. If the difference between the back calculated delta pressure, which is based upon a soot load calculation, and the measured delta pressure is greater than a predetermined threshold then a potential component failure may be more accurately identified and, an appropriate remedial action may be taken, if necessary.

Soot load models which may be used with an exemplary embodiment of the present disclosure are generally known in the art and are readily available from a number of sources. An exemplary soot load model may be based upon the disclosure in U.S. Pat. No. 7,474,953, the disclosure of which is incorporated herein in its entirety. U.S. Pat. No. 7,474,953 is assigned to AVL List GmbH and the assignee is a source for existing soot load models which may be used in exemplary embodiments of the present disclosure. A useful soot load model may be based upon an analysis of engine operating characteristics, such as, for example, fuel consumption, combustion temperatures, piston temperature, cylinder wall temperature, engine load, engine speed, air mass flow, air/fuel ratio, coolant temperature, intake temperature, filtering efficiency of the GPF, soot burn rate, exhaust oxygen concentration and the like, without limitation, and independent of a differential pressure across the GPF, which results in an engine out soot load estimation.

In another exemplary aspect, the soot load model may take a statistical approach to estimate the soot load of the GPF. In any case, in accordance with the present disclosure, the soot load model should be capable of estimating a soot load of the GPF independent of the differential pressure sensor measuring the differential pressure across the GPF. It is to be appreciated, however, that the present invention is not limited to any specific soot load model nor to any source of a soot load model and any soot load model may be used without limitation so long as it is based on inputs other than an output from differential pressure sensor measuring differential pressure across the GPF.

Figure 3:
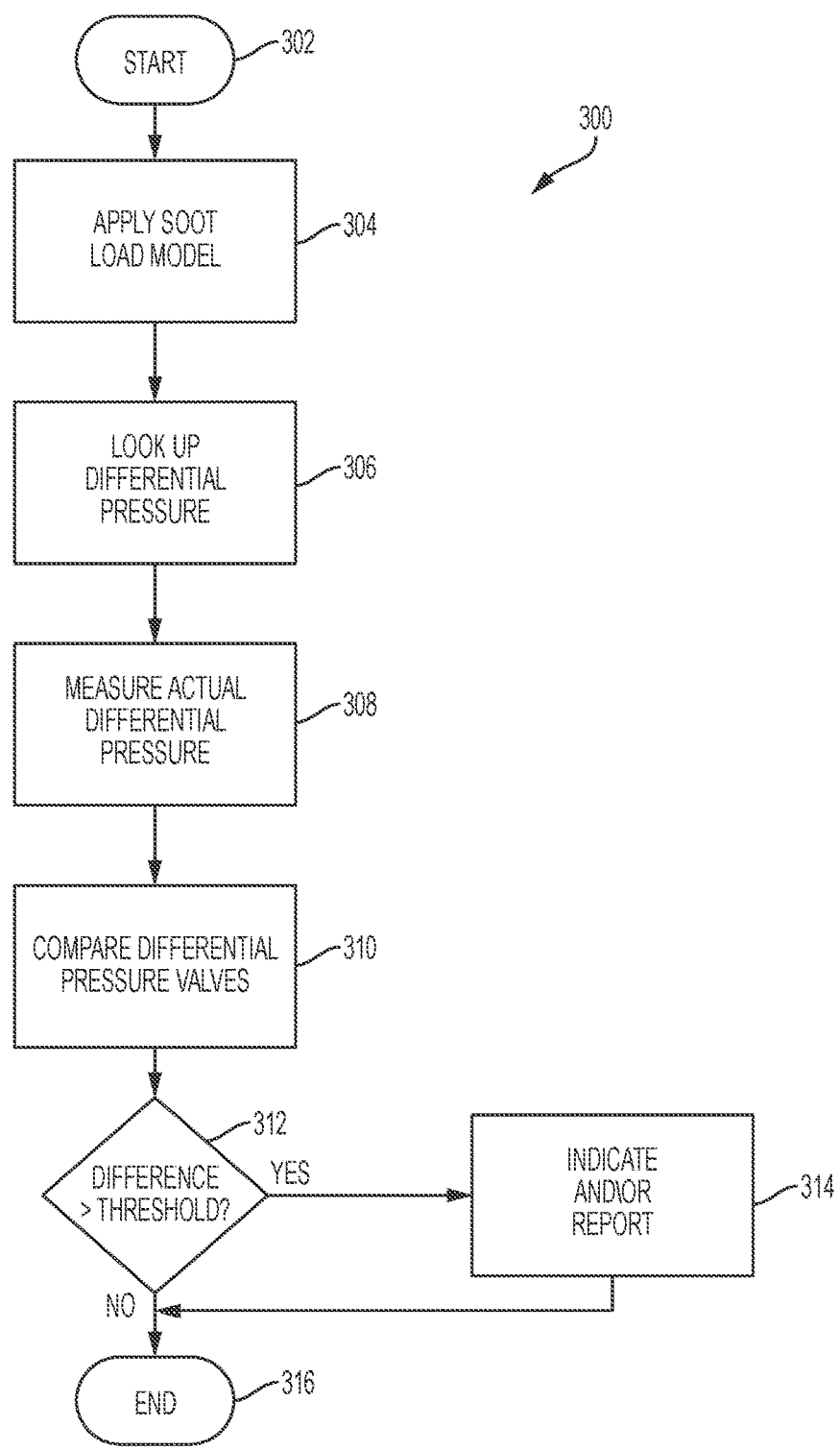
FIG. 3 is a flowchart of an exemplary method in accordance with the present disclosure.

FIG. 3 illustrates a flowchart 300 of an exemplary method in accordance with an exemplary embodiment of the present disclosure. The method starts at step 302 and continues to step 304. In step 304, the method calculates a soot load of the GPF based upon a soot load model which is independent from a differential pressure across the GPF. The method then continues to step 306. In step 306, the method refers to a known relationship between GPF soot load and the exhaust flow rate, an example of which is illustrated in the graph 200 of FIG. 2 to determine a corresponding estimate for a differential pressure across the GPF. The method then continues to step 308 where the method measures the actual differential pressure across the GPF and then continues to step 310. In step 310, the method compares the estimated differential pressure that was derived based upon a soot loading model to the measured differential pressure across the GPF. Next in step 312, the method determines if the difference in the two differential pressures exceed a predetermine threshold. If, in step 312, the method determines that the difference in differential pressures exceeds a predetermined threshold, then the method continues to step 314. In step 314, the method stores a diagnostic code, provides an indication of potential failure, and/or otherwise reports a potential failure of the differential pressure sensor and then continues to step 316. If, however, in step 312, the method determines that the difference in differential pressures does not exceed a predetermined threshold, then the method continues to step 316 where the method ends. In this manner, a method of rationalizing the differential pressure sensor may be provided.

Figure 4:
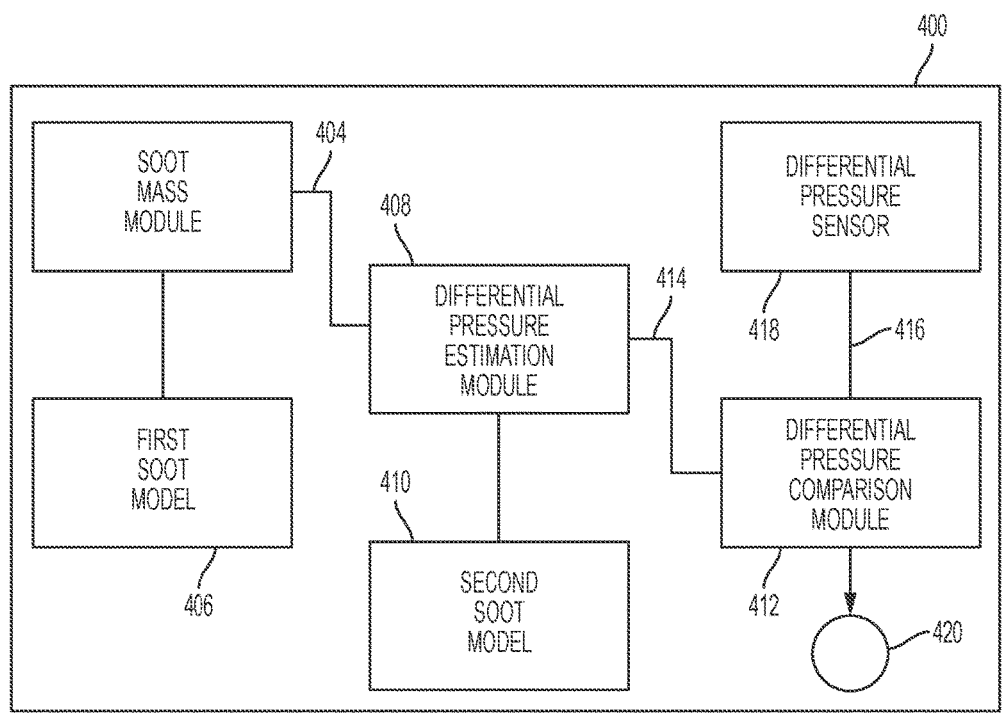
FIG. 4 is a schematic functional illustration of a differential pressure sensor rationalization system in accordance with an exemplary embodiment of the present disclosure.

FIG. 4 is a schematic functional illustration of a differential pressure sensor rationalization system 400 in accordance with an exemplary embodiment of the present disclosure. The system 400 includes a soot mass module 402 that determines a soot mass 404 indicative of an amount of soot stored in the particulate filter independently of a differential pressure across the particulate filter and with reference to a first soot model 406 that relates a soot mass in the particulate filter independently of a differential pressure across the particulate filter. The system 400 further includes a differential pressure module 408 that estimates a differential pressure across the particulate filter based upon the determined soot mass 404, an exhaust flow volume through the particulate filter, and with reference to a second soot model 410 that relates a differential pressure across the particulate filter, the exhaust flow volume and an amount of soot stored in the particulate filter. The system further includes a differential pressure comparison module 412 that compares the estimated differential pressure 414 to the actual/measured differential pressure signal 416 from a differential pressure sensor 418. If the difference between the estimated differential pressure 414 to the actual/measured differential pressure signal 416 from the differential pressure sensor is greater than a predetermined amount then the differential pressure comparison module 412 may generate an indicator to the vehicle of a potential failure. The differential pressure sensor rationalization system 400 may, optionally, form a portion of the controller 12 of FIG. 1.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system, the system comprising:
    an internal combustion engine having a combustion exhaust outlet;
    a particulate filter having an inlet in communication with the combustion exhaust outlet of the internal combustion engine for receiving a combustion exhaust stream;
    a differential pressure sensor in communication with the inlet to the particulate filter and an outlet of the particulate filter and that generates a differential pressure signal based upon the differential pressure between the particulate filter inlet and the particulate filter outlet;
    a soot mass module that determines a soot mass indicative of an amount of soot stored in the particulate filter independently of a differential pressure across the particulate filter and a first soot model that relates a soot mass in the particulate filter independently of a differential pressure across the particulate filter;
    a differential pressure module that estimates a differential pressure across the particulate filter based upon the determined soot mass, an exhaust flow volume through the particulate filter, and a second soot model that relates a differential pressure across the particulate filter, the exhaust flow volume and an amount of soot stored in the particulate filter; and
    a comparison module that compares the estimated differential pressure to the differential pressure signal from the differential pressure sensor and generates an indicator if the difference between the estimated differential pressure to the differential pressure signal from the differential pressure sensor is greater than a predetermined amount.

2. The system of claim 1, wherein the soot mass module determines a soot mass indicative of an amount of soot stored in the particulate filter based upon an estimated amount of soot exiting the engine.

3. The system of claim 2, wherein the soot mass module determines the soot mass indicative of an amount of soot stored in the particulate filter further based upon an engine out soot model.

4. The system of claim 1, further comprising an indicator that provides a notice in the vehicle of a potential failure in the particulate filter function of the vehicle.

5. The system of claim 1, further comprising a regeneration module that initiates regeneration of the particulate filter if the differential pressure signal, the volume of flow through the filter, and the second soot model indicate a soot load that is higher than a predetermined threshold.

6. The system of claim 1, wherein the soot mass module determines a soot mass indicative of an amount of soot stored in the particulate filter based upon an operating condition of the vehicle propulsion system.

7. The system of claim 6, wherein the operating condition comprises one of fuel consumption, a combustion temperature, a piston temperature, a cylinder wall temperature, an exhaust temperature, and an intake temperature.

8. The system of claim 1, wherein the soot mass module determines a soot mass indicative of an amount of soot stored in the particulate filter based upon one of a filtering efficiency of the particulate filter, a soot burn rate, and an exhaust oxygen concentration.

9. A method for rationalizing a differential pressure sensor in communication with an inlet for a particulate filter and an outlet of the particulate filter, the particulate filter in communication with a combustion exhaust outlet from an internal combustion engine in a vehicle propulsion system, the method comprising:
    generating a differential pressure signal based upon the differential pressure between the particulate filter inlet and the particulate filter outlet;
    determining a soot mass indicative of an amount of soot stored in the particulate filter independently of a differential pressure across the particulate filter and a first soot model that relates a soot mass in the particulate filter independently of a differential pressure across the particulate filter;
    estimating a differential pressure across the particulate filter based upon the determined soot mass, an exhaust flow volume through the particulate filter, and a second soot model that relates a differential pressure across the particulate filter, the exhaust flow volume and an amount of soot stored in the particulate filter;
    comparing the estimated differential pressure to the differential pressure signal from the differential pressure sensor; and generating an indicator if the difference between the estimated differential pressure to the differential pressure signal from the differential pressure sensor is greater than a predetermined amount.

10. The method of claim 9, wherein determining a soot mass indicative of an amount of soot stored in the particulate filter is based upon an estimated amount of soot exiting the engine.

11. The method of claim 10, wherein determining the soot mass indicative of an amount of soot stored in the particulate filter is further based upon an engine out soot model.

12. The method of claim 9, wherein indicating comprises providing a notice in the vehicle of a potential failure in the particulate filter function of the vehicle.

13. The method of claim 9, further comprising initiating regeneration of the particulate filter if the differential pressure signal, the volume of flow through the filter, and the second soot model indicate a soot load that is higher than a predetermined threshold.

14. The method of claim 9, wherein determining a soot mass indicative of an amount of soot stored in the particulate filter is based upon an operating condition of the vehicle propulsion system.

15. The method of claim 14, wherein the operating condition comprises one of fuel consumption, a combustion temperature, a piston temperature, a cylinder wall temperature, an exhaust temperature, and an intake temperature.

16. The method of claim 9, wherein determining a soot mass indicative of an amount of soot stored in the particulate filter is based upon one of a filtering efficiency of the particulate filter, a soot burn rate, and an exhaust oxygen concentration.

* * * * *